(12) United States Patent
Gubbels (10) Patent No.: US 11,505,690 B2
(45) Date of Patent: Nov. 22, 2022

(54) WATER-SWELLABLE POLYMER PARTICLES

(71) Applicant: BASF SE, Ludwigshafen am Rhein (DE)

(72) Inventor: Erik Gubbels, Ludwigshafen (DE)

(73) Assignee: BASF SE

( * ) Notice: Subject to any disclaimer, the term of this patent is extended or adjusted under 35 U.S.C. 154(b) by 584 days.

(21) Appl. No.: 16/486,320

(22) PCT Filed: Feb. 9, 2018

(86) PCT No.: PCT/EP2018/053319
§ 371 (c)(1),
(2) Date: Aug. 15, 2019

(87) PCT Pub. No.: WO2018/149750
PCT Pub. Date: Aug. 23, 2018

(65) Prior Publication Data
US 2020/0002522 A1 Jan. 2, 2020

(30) Foreign Application Priority Data
Feb. 16, 2017 (EP) .................................... 17156470

(51) Int. Cl.
*C08L 33/02* (2006.01)
*C08J 3/16* (2006.01)
*C04B 24/26* (2006.01)
*C04B 103/00* (2006.01)

(52) U.S. Cl.
CPC .......... *C08L 33/02* (2013.01); *C04B 24/2688* (2013.01); *C08J 3/16* (2013.01); *C04B 2103/0049* (2013.01); *C04B 2103/0051* (2013.01); *C04B 2103/0052* (2013.01); *C08L 2205/025* (2013.01); *C08L 2312/00* (2013.01)

(58) Field of Classification Search
CPC .................................................. C08J 2300/14
See application file for complete search history.

(56) References Cited

U.S. PATENT DOCUMENTS

| | | |
|---|---|---|
| 4,950,692 A | 8/1990 | Lewis et al. |
| 5,122,544 A | 6/1992 | Bailey et al. |
| 5,797,893 A * | 8/1998 | Wada .................... C08J 3/245 604/372 |
| 5,807,916 A | 9/1998 | Collette et al. |
| 8,288,491 B2 | 10/2012 | Gotou et al. |
| 2008/0045916 A1 | 2/2008 | Herfert et al. |
| 2011/0237468 A1 | 9/2011 | Reichenbach-Klinke et al. |
| 2013/0330566 A1 | 12/2013 | Takatori |
| 2014/0243458 A1 | 8/2014 | Tonami et al. |

FOREIGN PATENT DOCUMENTS

| | | |
|---|---|---|
| EP | 2 615 117 A1 | 7/2013 |
| EP | 2 692 741 A1 | 2/2014 |
| EP | 1 680 470 B1 | 2/2016 |
| JP | WO 2012/081355 A1 | 6/2012 |
| WO | WO 2015/062883 A2 | 5/2015 |
| WO | WO 2017/010660 A1 | 1/2017 |

OTHER PUBLICATIONS

Extended European Search Report dated Aug. 24, 2017 in European Patent Application No. 17156470.1, 3 pages.

* cited by examiner

*Primary Examiner* — Jeffrey C Mullis
(74) *Attorney, Agent, or Firm* — Faegre Drinker Biddle & Reath LLP

(57) ABSTRACT

The present invention is related to water-swellable polymer particles which contain a hydrophilic base polymer (B) and a hydrophobic polymer (P). It is also related to a process for producing the water-swellable polymer particles, an article containing the water-swellable polymer particles and the use of the water-swellable polymer particles.

15 Claims, 3 Drawing Sheets

Example M1

Example B1

Example B2

Example B3

Example B4

Example B5

Example B6

Example B7

Example B8

Example B9

Fig. 1a: Agglomerized particles according to Comparative Example M1 and inventive examples B1-B9

Example B10

Example B11

Example B12

Example B13

Example B14

Example B15

Fig. 1b: Agglomerized particles according to Comparative Example M1 and inventive examples B10-B15

Fig. 2: Particle size analysis of the primary particles.

Fig. 3: Particle size analysis of the primary particles treated with the polymer and sheared before measuring.

WATER-SWELLABLE POLYMER PARTICLES

The present invention is related to water-swellable polymer particles comprising a hydrophilic base polymer (B) and a hydrophobic polymer (P), a process for producing said water-swellable polymer, an article comprising said water-swellable polymer and the use thereof.

The modern production of water absorbing polymer particles is described in the monograph "Modern Superabsorbent Polymer Technology", FL Buchholz and AT Graham, Wiley-VCH, 1998, pages 69-117 are described. The water-absorbing polymer particles are typically prepared using solution polymerization or by inverse suspension polymerization. Water-absorbing polymers are used as products which absorb aqueous solutions to produce diapers, tampons and other hygiene products, but also as water-retaining agents in market gardening or as additives for dry mortar and cement in the construction industry.

Solution polymerization is the process of polymerizing an aqueous solution of ethylenically unsaturated monomers to form polymer-rich solution. Typically, this process is performed using a solid content between the 20-40%. During the polymerization reaction the reaction mixture forms a physical gel (i.e. Trommsdorf effect), which suppresses the termination rate of the reaction. Using this method, it is possible to prepare very high molecular weight polymers. Polymer prepared using this method are still fully soluble in the appropriate medium. To obtain water-absorbing polymers, monomers with a functionality greater (i.e. cross-linkers) than two are added. The incorporation of such multifunctional monomers yields an insoluble polymer network. Solution polymerization is a straightforward process of obtaining water-absorbing polymers. Disadvantages of using this approach are the need of grinding of the polymer and the formation of dust during the grinding. Dust formation is undesirable and can lead to EHS problems, therefore, these samples needed to be treated after the grinding to reduce the dust content. The dust content can be reduced by adding cross-linker molecules (as described in U.S. Pat. No. 5,122,544) or by reprocessing in the swollen state (U.S. Pat. No. 4,950,692). A further process has been described in WO 2017/010660, here water with additives was sprayed onto powder with a particle size smaller as 150 μm. This was subsequently dried and grounded again. However, as the other previously mentioned methods this requires additional process steps. Another route for the preparation of water-absorbing polymers can also be chosen and is preferred, which is inverse suspension polymerization.

Inverse suspension polymerization is the process of polymerizing an aqueous monomer phase which was dispersed in an oil phase. The aqueous monomer phase is dispersed in the oil phase using a conventional overhead stirrer. The interface between the aqueous and oil phase is typically stabilized using a mixture of surfactants and polymeric stabilizers. Such processes have been described in WO 2015/062883 or in EP 1 680 470. Such a process is technically feasible and is able to produce water-absorbing polymer particles with a size below 100 μm. Advantages from inverse suspension polymerization are the absence of dust and no polymer grinding is required. The problem with such an approach is that water-absorbing particles with a particle size smaller as 200 μm cannot be filtered from the oil. One approach of solving this problem is aggregating beads in the oil phase by adding a second batch of aqueous monomer into the oil phase after the polymerization has finished. This two-step inverse suspension polymerization leads to bigger agglomerates and has been described in EP 2 692 741 and EP 2 615 117. As addition on this process a method was described where by cooling the stabilizer precipitated before the second batch of monomer phase was added (WO 2012/081355 and EP 2 615 117). Such processes lead to agglomerates of particles which are connected via polymeric bridges. The disadvantages of this process are that such an agglomeration is not reversible, hence, the agglomerates cannot be broken up into their primary particles. It is imperative that the primary particles are obtained again. Secondly, this process is not robust against changes in composition of the primary particles or in the process. This makes this approach not flexible and difficult to be used in an application where the primary particles are desired after the agglomeration. Very close to this approach is the method published in U.S. Pat. No. 5,807,916 where the aqueous monomer phase also contained a hydrophilic thickener and surfactants with a hydrophilic-hydrophobic balance equal or greater as 8. However, this approach has similar draw-back as described above.

Another approach for agglomeration of water-absorbent particles is the use of a film forming polymer or a polymeric wax and has been described in US 2008/045916. This coating or wax would be heated for a period of time in the presence of the water-absorbent polymer to yield the larger agglomerates. Disadvantages of this process are the prolonged times at elevated temperatures, which could lead to undesired side-reactions. Moreover, such an approach seems feasible in the gel polymerization process, but for inverse suspension polymerization this could be problematic due to incompatibilities from the polymer/wax with the hydrophobic phase.

Thus, there is a need in the art for water-swellable polymer particles of small particle size which can be agglomerated reversibly.

Accordingly, it is an object of the present invention to provide readily agglomerating water-swellable polymer particles having a particle size equal or below 250 μm. This agglomeration needs to be reversible so that in the final application the water-swelling polymers are present as their original primary particles. Further, it is an object of the present invention to provide a process for producing water-swellable polymer particles with a particle size equal or below 250 μm.

The foregoing and other objects are solved by the subject-matter of the present invention.

According to a first aspect of the present invention, water-swellable polymer particles are provided, comprising
i) up to 99.9 wt.-% of a hydrophilic base polymer (B) which is optionally crosslinked, and
ii) up to 10.0 wt.-% of a hydrophobic polymer (P) being a copolymer of up to 95.0 mol-% of at least one (meth)acrylic acid ester and/or (meth)acrylic amide of formula (I)

wherein $R^1$ can be hydrogen or a methyl group,
V can be $OR^2$ or $NR^3R^4$,
$R^2$ and $R^3$ can be independently from each other hydrogen or linear or branched $C_1$ to $C_{30}$ alkyl,
$R^4$ can be hydrogen or linear or branched $C_1$ to $C_{30}$ alkyl,
and up to 35.0 mol-% of at least one ethlyenically unsaturated amine-containing monomer based on the overall weight of the water-swellable polymer particles.

It was surprisingly found by the inventors that the hydrophilic base polymer (B) is agglomerated by the hydrophobically soluble polymer (P) being a copolymer of a (meth)acrylic ester and/or (meth)acrylic amide of formula (I) and an amine-containing monomer. Said agglomeration can be broken chemically or by means of mechanical force and is, therefore, reversible. Functional groups coupled to the backbone of this hydrophobically soluble polymer would neutralize themselves to acid groups present on the surface of the primary water-swellable polymer particles and thus lead to an ionically driven flocculation. This flocculation is reversible since the interactions can be disturbed by mechanical shear, but also due to the presence of stronger bases when mixed into construction systems. The primary particles have an absorption capacity of at least 10 g/g, more preferable at least 15 g/g and most preferable 20 g/g in 1% calcium formate solution as well as low extractables. Moreover, a centrifuge retention capacity of 5 g/g, more preferably at least 8 g/g and most preferably at least 10 g/g in 1% calcium formate solution. The absorption and retention capacity of the primary particles is not affected by the presence of the hydrophobic polymer (P).

According to one embodiment of the present invention, the hydrophilic base polymer (B) comprises carboxyl groups, sulfonic acid groups and/or salts thereof or mixtures thereof.

It is especially preferred that the water-swellable polymer particles have a particle size $d_{50}$ equal or below 250 μm.

According to one embodiment of the present invention, the hydrophilic base polymer (B) is a copolymer of
i) at least one acid-containing monomer being an ethylenically unsaturated carboxylic acid-containing monomer and/or a sulfonic acid-containing monomer of formula (IIa) and/or formula (IIb)

(IIa)

(IIb)

Wherein Y can be —O— or —NH—, $R^5$ can be hydrogen or a methyl group, $R^6$, $R^7$ and $R^3$ are independently from each other hydrogen, OH, $C_1$-$C_6$-alkyl or $C_6$-$C_{14}$-aryl, n is 0 or 1, M can be hydrogen, a metal cation or an ammonium cation and a represents 1 or 1/valency of the metal cation, and Z is —$(CH_2)_m$— with m in the range of 0 to 10, ii) optionally at least one amide-containing monomer being a (meth)acrylamide-containing monomer of formula (III)

(III)

wherein $R^9$ can be hydrogen or methyl and $R^{10}$ and $R^{11}$ are independently from each other hydrogen, linear or branched $C_1$-$C_{20}$-alkyl, $C_5$-$C_8$-cycloalkyl or $C_6$-$C_{14}$-aryl, or N-Vinylformamide, and
iii) optionally a cross-linker.

According to another embodiment of the present invention, the hydrophilic base polymer (B) comprises
a) 10.0 to 70.0 mol-% of the at least one acid-containing monomer,
b) 0.0 to 90.0 mol-% of the at least one (meth)acrylamide-containing monomer of formula (III), and
c) 0.0 to 30.0 mol-% of cross-linker.

According to still another embodiment of the present invention, the at least one acid-containing monomer is selected from acrylic acid, methacrylic acid, ethacrylic acid, α-chloroacrylic acid, α-cyanoacrylic acid, ß-methylacrylic acid (crotonic acid), α-phenylacrylic acid, β-acryloxypropionic acid, sorbic acid, α-chloro sorbic acid, 2'-methylisocrotonic acid, cinnamic acid, p-chlorocinnamic acid, itaconic acid, citraconic acid, mesaconic acid, glutaconic acid, aconitic acid, maleic acid, fumaric acid, tricarboxyethylene, maleic anhydride, 2-acrylamido-2-methylpropane sulfonic acid (AMPS), styrenesulfonic acid, vinyl sulfonic acid, allyl sulfonic acid, 2-methylacrylamido-2-methylpropane sulfonic acid, 2-acrylamidobutane sulfonic acid, 3-acrylamido-3-methyl-butane sulfonic acid, 2-acrylamide-2,4,4-trimethylpentane sulfonic acid, 2-sulfoethyl acrylate, 2-sulfoethyl methacrylate, 3-sulfopropyl acrylate, 3-sulfopropyl methacrylate, 2-hydroxy-3-methacryloxypropyl sulfonic acid, salts thereof and/or mixtures thereof.

According to a further embodiment of the present invention, the at least one amide-containing monomer is selected from (meth)acrylamide, N-methyl(meth)acrylamide, N,N'-dimethyl(meth)acrylamide, N-ethylacrylamide, N,N-diethylacrylamide, N-cyclohexylacrylamide, N-benzylacrylamide, N-tert-butylacrylamide, N-Vinylformamide and/or mixtures thereof.

According to one embodiment of the present invention, the cross-linker is selected from N,N'-methylenebisacrylamide, N,N'-methylenebismethacrylamide, hexamethylenebismaleimde, ethylene glycol divinyl ether, triethylene glycol divinyl ether, cylcohexanediol divinyl ether, triallyl amine and/or tetra allyl ammonium salts, tetraallyloxyethane, pentaerythrittriallylether, divinyl benzene, triallyl isocyanurate, ethylene diamine, diethylene triamine, 1,4-butanediol diacrylate, 1,4-butanediol dimethacrylate, 1,3-butyleneglycol diacrylate, 1,3-butyleneglycol dimethacrylate, diethyleneglycol diacrylate, diethyleneglycol dimethacrylate, ethyleneglycol dimethacrylate, ethoxylated bisphenol-A-diacrylate, ethoxylated bisphenol-A-dimethacrylate, 1,6-hexanediol diacrylate, 1,6-hexanediol dimethacrylate, neopentylglycol dimethacrylate, polyethyleneglycol diacrylate, polyethyleneglycol dimethacrylate, triethyleneglycol diacrylate, tetraethyleneglycol dimethacrylate, dipentaerythritpentaacrylate, pentaerythrittetraacrylate, pentaerythrittriacrylate, trimethylolpropane triacrylate, trimethylolpropane trimethacrylate, cyclopentadiene diacrylate, tris(2-hydroxyethyl) isocyanurate triacrylate, tris(2-hydroxy) isocyanurate trimethylacrylate, divinyl esters of polycarboxylic acids, diallyl esters of polycarboxylic acids, triallyl terephthalate, diallyl maleate, diallyl fumarate, trivinyl trimellitate, divinyl adipate, diallyl succinate, glycidylacrylate, allylglycidether, ethyleneglycol diglycidether, diethyleneglycol diglycidether, polyethyleneglycol diglycidether, polypropyleneglycol diglycidether, polyethyleneglycolmonoallylether acrylate, polyethyleneglycolmonoallylether methacrylate and/or mixtures thereof.

According to another embodiment of the present invention, the hydrophobic polymer (P) is a copolymer of at least two (meth)acrylic acid esters or (meth)acrylic amides being a first (meth)acrylic acid ester or (meth)acrylic amide of formula (Ia) and a second (meth)acrylic acid ester or (meth)acrylic amide of formula (Ib)

wherein $R^{12}$ can be hydrogen or a methyl group,
W can be $OR^3$ or $NR^{13}R^{14}$,
$R^3$ can be a linear or branched $C_2$ to $C_9$ alkyl chain,
$R^{14}$ can be hydrogen or a linear or branched $C_2$ to $C_9$ alkyl chain,
T can be $OR^{16}$ or $NR^{16}R^{17}$,
$R^{16}$ can be a linear or branched $C_{10}$ to $C_{30}$ alkyl chain,
$R^{17}$ can be hydrogen or a linear or branched $C_{10}$ to $C_{30}$ alkyl chain,
and at least one ethlyenically unsaturated amine-containing monomer.

It is especially preferred that the first (meth)acrylic acid ester or (meth)acrylic amide of formula (Ia) is selected from ethylhexyl (meth)acrylate, n-butyl (meth)acrylate, tert-butyl (meth)acrylate, n-pentyl (meth)acrylate, 2-methylbutyl (meth)acrylate, n-hexyl (meth)acrylate, 2-methylpentyl (meth)acrylate, 2-ethylbutyl (meth)acrylate, n-heptyl (meth)acrylate, noctyl (meth)acrylate or mixtures thereof, and the second (meth)acrylic acid ester or (meth)acrylic amide of formula (Ib) is selected from stearyl (meth)acrylate, ethylhexyl (meth)acrylate, n-octyl (meth)acrylate, n-decyl (meth)acrylate, n-dodecyl (meth)acrylate, tridecyl (meth)acrylate, 2-propylheptyl (meth)acrylate and mixtures thereof.

According to one embodiment of the present invention, the at least one ethlyenically unsaturated amine-containing monomer is a (meth)acrylic acid ester or (meth)acrylic amide of formula (IV)

wherein $R^{18}$ can be hydrogen or a methyl group,
X can be —O— or —NH—,
$R^{19}$ and $R^{20}$ are independently from each other hydrogen or linear or branched $C_1$ to $C_{10}$ alkyl, and p is in the range of 1 to 10.

It is especially preferred that the at least one ethlyenically unsaturated amine-containing monomer is selected from N,N-dimethylaminoethyl (meth)acrylate, N,N-dimethylaminopropyl (meth)acrylate, N,N-dimethylaminoethyl (meth)acrylamide or mixtures thereof.

The present invention is further directed to a process for preparing the water-swellable polymer particles as described above, comprising the steps of
i) providing a suspension comprising the hydrophilic base polymer (B) as described above and a hydrophobic solvent,
ii) adding the hydrophobic polymer (P) as described above to the suspension obtained in step i), thereby obtaining the water-swellable polymer particles according to the present invention, and
iii) separating the water-swellable polymer particles obtained in step ii) from the hydrophobic solvent.

The present invention is also directed to a process, comprising the steps of
i) providing water-swellable polymer particles in accordance with step iii) of the previous paragraph,
ii) exposing said water-swellable polymer particles to mechanical force and/or a composition having a pH value of at least 12.

The present invention is also directed to the use of the water-swellable polymer particles as described above for hygiene products, constructions materials, $CaSO_4$ joined fillers, renderings, exterior insulation finishing systems, repair mortars, masonry mortars, cementitious tile adhesives and joint grouts.

Further, the present invention is directed to an article, comprising the water-swellable polymer particles as described above.

It is especially preferred that the article is a construction material.

In the following, the present invention is described in more detail.

The Water-Swellable Polymer Particles

As outlined above, the present invention is directed to water-swellable polymer particles. Water-swellable polymers are well known in the art for being capable of absorbing large amounts of aqueous solutions relative to their mass.

The inventive water-swellable polymer particles comprise a hydrophilic base polymer (B) and a hydrophobic polymer (P) being a copolymer of at least one (meth)acrylic acid ester and/or (meth)acrylic amide of formula (I)

wherein $R^1$ can be hydrogen or a methyl group,
V can be $OR^2$ or $NR^3R^4$,
$R^2$ and $R^3$ can be independently from each other hydrogen or linear or branched $C_1$ to $C_{30}$ alkyl,
$R^4$ can be hydrogen or linear or branched $C_1$ to $C_{30}$ alkyl,
and at least one ethlyenically unsaturated amine-containing monomer.

As used herein, the term "hydrophilic polymer" is related to a polymer showing a high affinity towards water and aqueous compositions. Thus, a hydrophilic polymer within the meaning of the present invention comprises functional groups capable of interacting with water and aqueous solutions. Said functional groups include, but are not limited to, acid functional groups and salts thereof such as carboxyl groups, sulfonic acid groups and/or salts thereof.

As used herein, the term "hydrophobic polymer" is related to a polymer showing low affinity towards water and aqueous solutions. Thus, a hydrophobic polymer within the meaning of the present invention is soluble in non-polar substances such as oils and hydrocarbons.

The water-swellable polymer particles comprise up to 99.9 wt.-%, more preferably 95.0 to 99.9 wt.-%, still more preferably 96.0 to 99.8 wt.-%, like 98.0 to 99.5 wt.-% of the hydrophilic base polymer (B) and up to 10.0 wt.-%, more preferably 0.1 to 5.0 wt.-%, still more preferably 0.2 to 4.0 wt.-%, like 0.5 to 2.0 wt.-%, of the hydrophobic polymer (P), based on the overall weight of the water-swellable polymer particles.

The water-swellable polymer particles according to the instant invention may include additives such as antioxidants, UV-stabilizers, polymeric stabilizers, salts or softening agents.

Accordingly, it is preferred that the water-swellable polymer particles comprise, more preferably consist of, 95.0 to 99.9 wt.-%, more preferably 96.0 to 99.8 wt.-%, still more preferably 98.0 to 99.5 wt.-% of the hydrophilic base polymer (B) and 0.1 to 5.0 wt.-%, more preferably 0.2 to 4.0 wt.-%, still more preferably 0.5 to 2.0 wt.-%, of the hydrophobic polymer (P) and 0.0 to 5.0 wt.-%, more preferably 0.0 to 3.0 wt.-%, still more preferably 0.0 to 1.0 wt.-% of additives, based on the overall weight of the water-swellable polymer particles.

The inventive water-swellable polymer particles are featured by a small particle size. Thus, it is preferred that the $d_{50}$ particle size of the water-swellable polymer particles is equal or below 250 µm, more preferably equal or below 200 µm, still more preferably equal or below 120 µm, like in a range of 70 to 120 µm.

In particular, it is preferred that at least 60 wt.-%, more preferably at least 80 wt.-%, still more preferably at least 90 wt.-%, like at least 99 wt.-%, of the water-swellable polymer particles have a $d_{50}$ particle size equal or below 250 µm, more preferably equal or below 200 µm, still more preferably equal or below 120 µm, like in a range of 70 to 120 µm, based on the overall weight of the water-swellable polymer particles. It is especially preferred that the water-swellable polymer particles consist of water-swellable polymer particles having a $d_{50}$ particle size equal or below 250 µm, more preferably equal or below 200 µm, still more preferably equal or below 120 µm, like in a range of 70 to 120 µm.

In the following, the hydrophilic base polymer (B) and the hydrophobic polymer (P) are described in more detail.

The Hydrophilic Base Polymer (B)

The water-swellable polymer particles comprise a hydrophilic base polymer (B).

As outlined above, a hydrophilic polymer within the meaning of the present invention is a polymer showing a high affinity towards water and aqueous compositions. Accordingly, it is preferred that the hydrophilic base polymer (B) comprises functional groups which enable strong interactions with water and aqueous compositions.

In particular, it is preferred that said functional groups are acid groups and/or salts thereof.

Preferably, the hydrophilic base polymer (B) comprises carboxyl groups, sulfonic acid groups and/or salts thereof.

Accordingly, it is preferred that the hydrophilic base polymer (B) comprises acid-containing monomer units such as carboxylic acid-containing monomers and/or salts thereof and/or sulfonic acid-containing monomers and/or salts thereof.

It is preferred that the carboxylic acid-containing monomers are ethylenically unsaturated carboxylic acid-containing monomers.

Preferred ethylenically unsaturated carboxylic acid-containing monomers are selected from the group consisting of acrylic acid, methacrylic acid, ethacrylic acid, α-chloroacrylic acid, α-cyanoacrylic acid, β-methylacrylic acid (crotonic acid), α-phenylacrylic acid, β-acryloxypropionic acid, sorbic acid, p-chloro sorbic acid, 2'-methylisocrotonic acid, cinnamic acid, p-chlorocinnamic acid, itaconic acid, citraconic acid, mesacronic acid, glutaconic acid, aconitic acid, maleic acid, fumaric acid, tricarboxyethylene, maleic anhydride, salts thereof or mixtures thereof.

Preferred sulfonic acid-containing monomers are compounds of formula (IIa) and/or formula (IIb)

wherein Y can be —O— or —NH—, $R^6$ can be hydrogen or a methyl group, $R^6$, $R^7$ and $R^8$ are independently from each other hydrogen, OH, $C_1$-$C_6$-alkyl or $C_6$-$C_{14}$-aryl, n is 0 or 1, M can be hydrogen, a metal cation or an ammonium cation and a represents 1 or 1/valency of the metal cation, and Z is —$(CH_2)_m$— with m in the range of 0 to 10, It is particularly preferred that the hydrophilic base polymer (B) comprises sulfonic acid groups and/or salts thereof.

Preferably, the sulfonic acid-containing monomers according to the instant invention are selected from the group consisting of 2-acrylamido-2-methylpropane sulfonic acid (AMPS), styrenesulfonic acid, vinyl sulfonic acid, allyl sulfonic acid, 2-methylacrylamido-2-methylpropane sulfonic acid, 2-acrylamidobutane sulfonic acid, 3-acrylamido-3-methyl-butane sulfonic acid, 2-acrylamide-2,4,4-trimethylpentane sulfonic acid, 2-sulfoethyl acrylate, 2-sulfoethyl methacrylate, 3-sulfopropyl acrylate, 3-sulfopropyl methacrylate, 2-hydroxy-3-methacryloxypropyl sulfonic acid or mixtures thereof. Particularly preferred are example 2-acrylamido-2-methylpropane sulfonic acid (AMPS) or styrenesulfonic acid. Very particularly preferred is 2-acrylamido-2-methylpropane sulfonic acid (AMPS) and/or salts thereof.

The acid-containing monomers are preferably water-soluble. Accordingly, the solubility in water at 23° C. is preferably at least 1 g/100 g water, more preferably at least 10 g/100 g water, still more preferably at least 25 g/100 g water, most preferably at least 35 g/100 g water.

The acid-containing monomers may be partially neutralized. The neutralization is carried out at the stage of monomers. This is typically done by mixing in the neutralization agent as a liquid or else as a solid. The neutralization degree is preferably greater as 95% and more preferably greater as 99%, for which customary neutralizing agents can be used, preferably alkali metal hydroxides, alkali metal oxides, alkali metal carbonates or alkali metal hydrogen carbonates and mixtures thereof. Sodium or potassium are particularly preferred, but most preference is given to sodium hydroxide, sodium carbonate or sodium bicarbonate or mixtures thereof.

The acid-containing monomers typically comprise polymerization inhibitors preferably hydroquinone monoether, as storage stabilizer. The monomer solution comprises preferably up to 250 ppm by weight, particularly preferably up to 130 ppm by weight, and most preferably up to 100 ppm by weight.

Preferably, the hydrophilic base polymer (B) comprises at least 10.0 mol-%, more preferably at least 15.0 mol-%, still more preferably at least 20.0 mol-% of acid-containing monomer.

Further, it is preferred that the hydrophilic base polymer (B) comprises amide groups.

Thus, it is preferred that the hydrophilic base polymer (B) comprises amide-containing monomer units. Suitable amide-containing monomers are ethylenically unsaturated compounds having primary, secondary or tertiary amide functionalities.

The amide-containing monomer is preferably a (meth) acrylamide-containing monomer of formula (III)

(III)

wherein $R^9$ can be hydrogen or methyl and $R^{10}$ and $R^{11}$ are independently from each other hydrogen, linear or branched $C_1$-$C_{20}$-alkyl, $C_5$-$C_8$-cycloalkyl or $C_6$-$C_{14}$-aryl, or N-Vinylformamide.

Preferably, the amide-containing monomer is selected from the group consisting of (meth)acrylamide, N-methyl (meth)acrylamide, N,N'-dimethyl(meth)acrylamide, N-ethylacrylamide, N,N-diethylacrylamide, N-cyclohexylacrylamide, N-benzylacrylamide, N-tert-butylacrylamide, N-Vinylformamide or mixtures thereof. Particularly preferred are acrylamide and N,N'-dimethyl(meth)acrylamide. Very particularly preferred is acrylamide.

The amide-containing monomers are preferably water-soluble. Accordingly, the solubility in water at 23° C. is preferably at least 1 g/100 g water, more preferably at least 10 g/100 g water, still more preferably at least 25 g/100 g water, most preferably at least 35 g/100 g water.

The acrylamide can be prepared from acrylonitrile using hydrolysis. Typically, this may be one of the known chemically catalyzed processes using inorganic catalysts such as Raney copper. However, the acrylamide could also be prepared using a biological or biological catalyzed process. Suitably this may be achieved by contacting acrylonitrile with a nitrile hydratase enzyme, for example as documented in patents and literature.

Preferably, the hydrophilic base polymer (B) comprises at least 50.0 mol-%, more preferably at least 60.0 mol-%, still more preferably at least 70.0 mol-% of the amide containing monomer.

According to a preferred embodiment, the hydrophilic base polymer (B) is crosslinked.

Therefore, it is preferred that the hydrophilic base polymer (B) comprises a cross-linker.

As used herein, the term "cross-linker" is related to compounds having at least two groups suitable for cross-linking. Such groups are for example ethylenically unsaturated groups which can be free-radically polymerized into the polymer chain. Further, polyvalent metal salts which can form coordinate bonds with at least two acid groups of the monomers are suitable cross-linkers.

Within the context of this invention two classes of cross-linkers are identified, the hydrolysable and non-hydrolysable. A non-hydrolysable cross-linker is defined as a cross-linker which is part of the network and retains it network building capability at all pH-values. The cross-links can therefore not be broken up during the swellable of the water-absorbing polymer. On the contrary, hydrolysable cross-linkers are cross-linker which are part of the network, but lose their network capability after a change in the pH. One example for this is a diacrylate cross-linker, which loses is cross-linking ability due to ester hydrolysis.

Possible cross-linkers are N,N'-methylenebisacrylamide, N,N'-methylenebismethacrylamide and monomers containing more than one maleimide-group for example hexamethylenebismaleimde; monomers containing more than one vinylether-group for example ethylene glycol divinyl ether, triethylene glycol divinyl ether or cylcohexanediol divinyl ether. Also allylamino- or allylammonium-based monomers with more than one allyl-group can be used, such as triallyl amine and/or tetra allyl ammonium salts. Allylether with more than one allyl-group such as tetraallyloxyethane or pentaerythrittriallylether, or monomers with vinylaromatic groups such as divinyl benzene or triallyl isocyanurate also belong to the group of non-hydrolysable cross-linkers. Further suitable cross-linkers are diamines, triamines, tetramines or higher amines, preferably ethylene diamine and diethylene triamine, di-, tri- or tetra (meth)acrylates such as 1,4-butanediol diacrylate, 1,4-butanediol dimethacrylate, 1,3-butyleneglycol diacrylate, 1,3-butyleneglycol dimethacrylate, diethyleneglycol diacrylate, diethyleneglycol dimethacrylate, ethyleneglycol dimethacrylate, ethoxylated bisphenol-A-diacrylate, ethoxylated bisphenol-A-dimethacrylate, 1,6-hexanediol diacrylate, 1,6-hexanediol dimethacrylate, neopentylglycol dimethacrylate, polyethyleneglycol diacrylate, polyethyleneglycol dimethacrylate, triethyleneglycol diacrylate, tetraethyleneglycol dimethacrylate, dipentaerythritpentaacrylate, pentaerythrittetraacrylate, pentaerythrittriacrylate, trimethylolpropane triacrylate, trimethylolpropane trimethacrylate, cyclopentadiene diacrylate, tris(2-hydroxyethyl) isocyanurate triacrylate and/or tris(2-hydroxy) isocyanurate trimethylacrylate, monomers carrying more than one vinyl- or allyl ester-group and the corresponding carboxylic acids such as divinyl esters of polycarboxylic acids, diallyl esters of polycarboxylic acids, triallyl terephthalate, diallyl maleate, diallyl fumarate, trivinyl trimellitate, divinyl adipate and/or diallyl succinate, monomers comprising at least one vinylic or allylic double bond and at least one epoxy group such as glycidylacrylate or allylglycidether or monomers comprising more than one epoxy group such as ethyleneglycol diglycidether, diethyleneglycol diglycidether, polyethyleneglycol diglycidether, polypropyleneglycol diglycidether or monomers comprising at least one vinylic or allylic double bond and at least one (meth)acrylate-group such as polyethyleneglycolmonoallylether acrylate or polyethyleneglycolmonoallylether methacrylate It is preferred that the cross-linker is a monomer comprising at least two ethylenically unsaturated groups.

In particular, it is preferred that the cross-linker is selected from the group consisting of N,N'-methylenebisacrylamide, N,N'-methylenebismethacrylamide, tetra allyl ammonium salts, divinyl ethers or mixtures thereof. More preferably, the cross-linker is selected from preferably N,N'-methylenebisacrylamide, tetra allyl ammonium salts or N,N'-methylenebismethacrylamide. It is particularly preferred that the cross-linker is N,N'-methylenebisacrylamide.

With the acid containing monomer and the amide-containing monomer, various other monomers can be copolymerized. Thus, the hydrophilic base polymer (B) may comprise further monomers selected from anionic, cationic or neutral categories or combinations thereof.

However, it is particularly preferred that the hydrophilic base polymer (B) does not comprise further monomers other than the acid-containing monomer, the amide-containing monomer and optionally the cross-linker as defined above.

Thus, it is preferred that the hydrophilic base polymer (B) comprises, more preferably consists of, 10.0 to 70.0 mol-%, more preferably 15.0 to 40.0 mol-%, still more preferably 20.0 to 30.0 mol-% of the acid containing monomer, 50.0 to 90.0 mol-%, more preferably 55.0 to 85.0 mol-%, still more preferably 60.0 to 75.0 mol-% of the amide-containing monomer, and 0.0 to 30.0 mol-%, more preferably 0.001 to 10.0 mol-%, still more preferably 0.01 to 1.0 mol-% of the crosslinker, based on the overall hydrophilic base polymer (B).

Optionally, the monomers or precursors can contain chelating agents for masking from metal ions, for example iron, are added for the stabilization of the monomer phase. Suitable chelating agents are for example alkali metal citrates, citric acid, pentasodium ethylenediamine tetraacetate, pentasodium diethylene-triamine pentaacetate, trisodium (hydroxyethyl) ethylene-diamine triacetate, as well as methylglycine.

The preferred polymerization inhibitors require dissolved oxygen for their optimal performance. Therefore, the monomer solution should be treated with an inert gas (e.g. inertization) such as carbon dioxide or nitrogen. Preferably, the oxygen content before the polymerization is reduced to less than 1 ppm, more preferably less than 0.5 ppm and most preferably less than 0.1 ppm.

The hydrophilic base polymer (B) can be prepared by means of anionic, cationic or radical polymerization, the latter being preferred.

The process for the preparation of the hydrophilic base polymer (B) is described in more detail below.

The Hydrophobic Polymer (P)

As outlined above, the water-swellable particles according to the instant invention further comprise a hydrophobic polymer (P).

Said hydrophobic polymer (P) is a copolymer of at least one (meth)acrylic acid ester and/or (meth)acrylic amide of formula (I)

(I)

wherein $R^1$ can be hydrogen or a methyl group,
V can be $OR^2$ or $NR^3R^4$,
$R^2$ and $R^3$ can be independently from each other hydrogen or linear or branched $C_1$ to $C_{30}$ alkyl,
$R^4$ can be hydrogen or linear or branched $C_1$ to $C_{30}$ alkyl,
and at least one ethlyenically unsaturated amine-containing monomer.

The hydrophobic polymer (P) comprises up to 95.0 mol-%, preferably 5.0 to 95.0 mol-%, more preferably 40.0 to 92.0 mol-%, still more preferably 70.0 to 88.0 mol-% of the at least one (meth)acrylic ester and/or (meth)acrylic amide of formula (I) and up to 35.0 mol-%, preferably 1.0 to 35.0 mol-%, more preferably 5.0 to 35.0 mol-%, most preferably 7.0 to 30.0 mol-% of the at least one ethlyenically unsaturated amine-containing monomer.

According to a preferred embodiment of the present invention, the hydrophobic polymer (P) is a copolymer of at least two (meth)acrylic acid esters or (meth)acrylic amides being a first (meth)acrylic acid ester or (meth)acrylic amide of formula (Ia) and a second (meth)acrylic acid ester or (meth)acrylic amide of formula (Ib)

(Ia)

(Ib)

wherein $R^{12}$ can be hydrogen or a methyl group,
W can be $OR^{13}$ or $NR^{13}R^{14}$,
$R^{13}$ can be a linear or branched $C_2$ to $C_9$ alkyl chain,
$R^{14}$ can be hydrogen or a linear or branched $C_2$ to $C_9$ alkyl chain,
T can be $OR^{16}$ or $NR^{16}R^{17}$,
$R^{16}$ can be a linear or branched $C_{10}$ to $C_{30}$ alkyl chain,
$R^7$ can be hydrogen or a linear or branched $C_{10}$ to $C_{30}$ alkyl chain,
and at least one ethylenically unsaturated amine-containing monomer.

Accordingly, it is preferred that the hydrophobic polymer comprises, more preferably consists of, 20.0 to 60.0 mol-%, more preferably 27.0 to 55.0 mol-%, still more preferably 33.0 to 50.0 mol-% of the first (meth)acrylic acid ester or (meth)acrylic amide of formula (Ia), 15.0 to 50.0 mol-%, more preferably 20.0 to 48.0 mol-%, still more preferably 25.0 to 44.0 mol-% of the second (meth)acrylic acid ester or (meth)acrylic amide of formula (Ib), and up to 35.0 mol-%, more preferably 5.0 to 35.0 mol-%, more preferably 7.0 to 35.0 mol-%, still more preferably 10.0 to 30.0 mol-% of the at least one ethlyenically unsaturated amine-containing monomer.

Preferably, the first (meth)acrylic acid ester or (meth)acrylic amide of formula (Ia) is a first (meth)acrylic ester selected from the group consisting of ethylhexyl (meth)acrylate, n-butyl (meth)acrylate, tert-butyl (meth)acrylate, n-pentyl (meth)acrylate, 2-methylbutyl (meth)acrylate, n-hexyl (meth)acrylate, 2-methylpentyl (meth)acrylate, 2-ethylbutyl (meth)acrylate, n-heptyl (meth)acrylate, n-octyl (meth)acrylate or mixtures thereof.

It is particularly preferred that the first (meth)acrylic acid ester is ethylhexyl acrylate (EHA).

Preferably, the second (meth)acrylic acid ester or (meth)acrylic amide of formula (Ib) is a second (meth)acrylic ester selected from the group consisting of stearyl (meth)acrylate, ethylhexyl (meth)acrylate, n-octyl (meth)acrylate, n-decyl (meth)acrylate, n-dodecyl (meth)acrylate, tridecyl (meth)acrylate, 2-propylheptyl (meth)acrylate and mixtures thereof.

It is particularly preferred that the second (meth)acrylic acid ester is stearyl methacrylate.

According to a preferred embodiment, the ethylenically unsaturated amine-containing monomer is of formula (IV)

(IV)

wherein $R^{18}$ can be hydrogen or a methyl group,

X can be —O— or —NH—, $R^{19}$ and $R^{20}$ are independently from each other hydrogen or linear or branched $C_1$ to $C_{10}$ alkyl, and p is in the range of 1 to 10.

It is preferred that the ethylenically unsaturated amine-containing monomer is selected from the group consisting of N,N-dimethylaminoethyl (meth)acrylate, N,N-dimethylaminopropyl (meth)acrylate, N,N-dimethylaminoethyl (meth)acrylamide or mixtures thereof.

It is especially preferred that the ethylenically unsaturated amine-containing monomer is N,N-dimethylaminoethyl methacrylate.

The hydrophobic polymer (P) according to the instant invention preferably has a moderate molecular weight. Accordingly, it is preferred that the hydrophobic polymer (P) has a weight molecular weight $M_w$ of at least 100 kg/mol, more preferably in the range of 100 to 2000 kg/mol, still more preferably in the range of 150 to 1000 kg/mol, yet more preferably in the range of 200 to 400 kg/mol, like in the range of 210 to 320 kg/mol.

Further, it is preferred that the hydrophobic polymer (P) is featured by a rather narrow molecular weight distribution. Thus, it is preferred that the molecular weight distribution $M_w/M_n$ of the hydrophobic polymer (P) is below 4.0, more preferably below 3.5, still more preferably below 3.0, like in a range of 1.2 to 2.9.

The hydrophobic polymer (P) can be prepared by means of anionic, cationic or radical polymerization, the latter being preferred.

The hydrophobic polymer (P) can be prepared by means of homogeneous as well as heterogeneous radical polymerization processes including bulk polymerization, solution polymerization, emulsion polymerization and suspension polymerization. It is preferred that the hydrophobic polymer (P) is obtained by means of solution polymerization.

For the preparation of the hydrophobic polymer (P), at least one (meth)acrylic acid ester or (meth)acrylic amide of formula (I) and an initiator are dissolved or dispersed in a solvent.

Non-limiting examples for suitable solvents are butyl acetate, ethyl acetate, cyclohexane, benzene, toluene, dichloromethane, chloroform, tetrahydrofuran or mixtures thereof.

The initiator is a compound which generate radicals under the polymerization conditions, for example thermal initiators and redox initiators. Preferably a combination of different initiator is chosen, with most preferably a combination from a redox initiator and thermal initiator.

Suitable redox initiators are potassium or sodium/ascorbic acid, hydrogen peroxide/ascorbic acid, potassium or sodium/sodium sulfite, hydrogen peroxide/sodium sulfite, tert-butyl hydroperoxide/sodium sulfite, sodium bromate/sodium sulfite, hydrogen peroxide/sodium bisulfite, tert-butyl hydroperoxide/sodium bisulfite and sodium bromate/sodium bisulfite. Preferably the redox couple tert-butyl hydroperoxide/sodium sulfite is used and combined with the thermal initiators.

Suitable thermal initiators are in particular azo initiators such as azoisobutyronitrile, dibenzoylperoxide, 2,2'-Azobis(2-methylpropionamidine)dihydrochloride, or sodium peroxide sulfate, or combinations thereof.

The composition comprising the monomers, the initiator and the solvent is heated to 50° C. to 80° C. in order to start the polymerization.

The obtained hydrophobic polymer (P) can subsequently be separated from the solvent and dried or further used in solution as obtained after the polymerization process, the latter being preferred.

The Process

The water-swellable polymer particles according to the instant invention are obtainable by a process comprising the steps of i) providing a suspension comprising the hydrophilic base polymer (B) as described above and a hydrophobic solvent, ii) adding the hydrophobic polymer (P) as described above to the suspension obtained in step i), thereby obtaining the water-swellable polymer particles according to the present invention, and iii) separating the water-swellable polymer particles obtained in step ii) from the hydrophobic solvent.

According to step i), a suspension of the hydrophilic base polymer (B) in a hydrophobic solvent is provided.

It is preferred that the suspension of the hydrophilic base polymer (B) in a hydrophobic solvent is a water-free suspension.

As used herein, the term "water-free" is related to a composition which does not contain water in amounts of more than 10 wt.-%, preferably not more than 8 wt.-%, more preferably not more than 5 wt.-%.

In a preferred embodiment of the invention, a suspension comprising the hydrophilic base polymer (B) is dewatered under reduced pressure in order to obtain a water-free suspension of the hydrophilic base polymer (B) in a hydrophobic solvent.

As used herein, the term "hydrophobic solvent" is related to a solvent which does not dissolve/swell the hydrophilic base polymer (B) or the monomers for the hydrophilic base polymer (B) as defined above. Aliphatic hydrocarbons such as n-hexane, n-heptane, n-octane, n-nonane, n-decane, n-undecane, n-dodecane, cyclohexane, or mixtures thereof. Such hydrocarbons are obtainable from Exxonmobil under the tradename Exxsol D40 for example. The hydrophobic solvents have a solubility in water preferably below 5 g/100 g, more preferably below 1 g/100 g and most preferably below 0.5 g/100 g.

The hydrophobic solvent has a boiling point in the range of preferably 120 to 180° C., most preferably from 150 to 170° C.

The water-free suspension of the hydrophilic base polymer (B) and the hydrophobic solvent can be obtained by blending the hydrophilic base polymer (B) with the hydrophobic solvent and optionally with subsequent removal of the residual water as described above.

Alternatively, the water-free suspension of the hydrophilic base polymer (B) and the hydrophobic solvent can be obtained by polymerizing the acid-containing monomer, optionally the amide-containing monomer and optionally the cross-linker as defined above in the hydrophobic solvent.

Preferably, the water-free suspension of the hydrophilic base polymer (B) and the hydrophobic solvent is obtained by polymerizing the monomers in the hydrophobic solvent.

The hydrophilic base polymer (B) can be prepared by means of anionic, cationic or radical polymerization, the latter being preferred.

For the preparation of the hydrophilic base polymer (B), homogeneous as well as heterogeneous radical polymerization processes including bulk polymerization, solution polymerization, emulsion polymerization and suspension polymerization. It is preferred that the hydrophilic base polymer (B) is obtained by means of suspension polymerization.

In particular, it is preferred that the hydrophilic base polymer (B) is obtained by inverse suspension polymerization.

As used herein, the term "inverse suspension polymerization" is related to a polymerization process wherein water-soluble monomers and a water soluble initiator are suspended in a hydrophobic solvent. The polymerization takes place within the thus formed monomer droplets.

The ratio between the aqueous monomer phase and the hydrophobic solvent is from 0.4 to 0.9, more preferably between 0.5 to 0.8 and most preferably between 0.5 to 0.65.

To disperse the aqueous monomer phase in the hydrophobic solvent compounds are required which show interfacial activity. These compounds may be anionic, cationic, non-ionic or amphoteric surfactants or natural, semi-synthetic or synthetic polymers. These compounds can be used alone but more preferably the surfactants are used in combination with the interfacially active polymers. Examples of the surfactants could be dodecyl ether sulfate, trimethyl stearyl ammonium chloride or sucrose fatty esters. Examples from the sucrose fatty esters could be sorbitan esters and more preferably sorbinan mono oleate. Examples from the interfacially active polymers could be hydroxylpropyl methylcellulose or random copolymers from acrylic acid and (meth)acrylates.

The interfacially active substances are dissolved or dispersed in the hydrophobic phase and are used in the amount of 0.1 to 10 wt %, preferably 0.2 to 5 wt % and more preferably 1 to 3 wt % based on the monomer solution.

The amount of cross-linker in the monomer solution is selected so that the water-swellable particles have an absorption capacity of at least 10 g/g, more preferable at least 15 g/g and most preferable 20 g/g in 1% calcium formate solution as well as low extractables. Moreover, a centrifuge retention capacity of 5 g/g, more preferably at least 8 g/g and most preferably at least 10 g/g in 1% calcium formate solution.

The aqueous monomer phase further comprises an initiator. Regarding suitable initiators, reference is made to the initiators provided above with regard to the hydrophobic polymer (P).

Before the polymerization the dispersed aqueous monomer phase is heated up to 25 to 50° C., but more preferably from 30 to 40° C. The polymerization is started at the temperature by the addition of the initiators and the reaction mixture is heated by the exothermic nature of the polymerization. The end temperature of the polymerization can be tuned by varying the solid content in the monomer phase. The end temperature is preferably between 50 and 80° C., more preferably 55 to 75° C. and most preferably from 60 to 70° C.

In a preferred embodiment of the invention, the suspension comprising the hydrophilic base polymer (B) is subsequently dewatered under reduced pressure in order to obtain the water-free suspension of the hydrophilic base polymer (B) and the hydrophobic solvent according to step i).

To this water-free suspension obtained after step i) the hydrophobic polymer (P) is added to agglomerate the hydrophilic base polymer (B) whereupon the water-swellable polymer particles according to the present invention are obtained. The agglomeration takes place at temperatures from 0 to 100° C., but more preferably from 20 to 80° C. The amount of the hydrophobic polymer (P) which is added is between the 10 and 100000 ppm, but more preferably from 100 to 50000 ppm and most preferably from 1000 to 10000 ppm based on the total weight of the suspension.

The obtained water-swellable polymer particle agglomerates are composed from the primary particles but have a particle size larger compared to the primary particle size. These agglomerates are reversible so that when sheared these larger structures would decimate into their original particles. These primary particles would have a centrifuge retention capacity of at least 10 g/g, preferably at least, more preferably 15 g/g and most preferably 20 g/g in 1% calcium formate solution also after their agglomeration. The water-swellable particles would contain less than 17 wt %, more preferably 15 wt % or most preferably less than 10 wt % of extractables.

According to step iii) of the inventive process, the water-swellable polymer particles obtained in step ii) are separated from the hydrophobic solvent. Non-limiting examples of suitable separation processes are filtration, centrifugation or sieving.

After separation from the hydrophobic solvent, it is preferred that the water-swellable polymer particles are dried at temperatures of at least 30° C., more preferably at least 40° C., still more preferably at least 50° C.

As outlined above, the presence of the hydrophobic polymer (P) leads to an agglomeration of the hydrophilic base polymer (B). Accordingly, the water-swellable particles obtained after step iii) of the inventive process comprising the hydrophilic base polymer (B) and the hydrophobic polymer (P) are present as an agglomerate. Said agglomeration, however, is reversible which means that the agglomerate can be transformed into fine particles. The transformation of the agglomerate into fine particles is possible by means of mechanical forces or chemically.

Thus, it is preferred that the water-swellable particles obtained after step iii) of the above described process are subsequently exposed to mechanical forces and/or a composition having a pH value of at least 12, more preferably at least 12.5.

It is preferred that said mechanical forces are shearing forces.

Accordingly, the present invention is further directed to a process, comprising the steps of
i) providing water-swellable polymer particles in accordance with step iii) of the above described process, and
ii) exposing said water-swellable polymer particles to mechanical force and/or a composition having a pH value of at least 12.

The Use

The present invention is further directed to the use of the inventive water-swellable polymer particles in foams, fibers, foils, films, cables, sealants, coatings, carriers for plants, packaging materials, ground additives or in construction materials. Preferably these can be used in water-based construction materials that contain hydraulic binder, especially which contain cement, calk, gypsum, anhydrite or other calcium sulfate containing binders.

Non-limiting examples for construction materials are $CaSO_4$ joined fillers, renderings, exterior insulation finishing systems, repair mortars, masonry mortars, cementitious tile adhesives and joint grouts.

The Article

The present invention is also directed to an article comprising the inventive water-swellable polymer particles.

It is especially preferred that the article is a construction material as defined above.

Preferably, said construction material is a construction material based on water-based construction materials that contain inorganic binder, especially which contain cement, calk, gypsum, anhydrite or other calcium sulfate containing binders.

The scope and interest of the invention will be better understood based on the following examples which are intended to illustrate certain embodiments of the invention and are nonlimitative.

EXAMPLES

Methods

Gel permeation chromatography (GPC) was performed on a Waters alliance separation module 2695 with three GPC columns (SDV, $10^6$, $10^3$ and $10^2$ Å, 5 μm, 300×8 mm from Polymer Standard Service (PSS), Germany). Tetrahydrofuran (THF) containing 0.1% of trifluoroacetic acid was used as eluent. The elution was done with a flow rate of 0.8 mL/min and a column temperature of 35° C. A Waters refractive index (RI) 2410 detector was used. The calibration was carried with PEO/PEG standards (PSS).

The absorption and centrifuge retention capacity of the polymer samples was determined on a sample from 50-250 mg in a teabag. This teabag was placed in the container of distilled water or in a container containing calcium formate solution (1 wt %). The teabags were placed in the different media for 30 minutes and afterwards these were hung to dry and after these stopped dropping their weight was measured (absorption value). The samples were then put in a centrifuge (Thomas®) and centrifuged at 1400 rpm for 3 minutes afterwards their weight was measured again (retention value).

The particle size of the powder was determined using a Mastersizer 2000 from Malvern, which measures the particle size by measuring the reflection of a laser beam onto the particles. To this end, the samples were dried and the machine was flushed with pressurized air to remove impurities. Afterwards, the sample was added into the machine and the particle size was determined.

Preparation of the Oil-Soluble Polymer (Example P1)

An oil bath was pre-heated to 75° C. before the reaction. Simultaneously, in a 500 mL round-bottom flask 0.3 g azobisisobutyronitrile was placed, to this 209.4 g of butyl acetate, 52.3 g of stearyl methacrylate (SMA), 29.0 g of a 98 wt % from an ethylhexyl acrylate (EHA) solution and 9.3 g of 2-dimethylaminoethyl methacrylate (DMAEMA) were added. After which the reactor was closed and the monomer solution was flushed with nitrogen for 20 minutes. After the flushing, the reactor was heated to 75° C. in order to start the free radical polymerization. When the reaction was complete the mixture was cooled down and the polymer was analyzed. The obtained copolymer had a solid content from approx. 30%. The average molecular weight from the polymers was determined to be 86 kg/mol with a PDI from 2.9.

The examples P2-P5 have been prepared via a similar method as described for P1 with the monomer compositions as presented in Table 1 and the molecular weights of these materials have been presented in Table 2.

TABLE 1

| | Monomer compositions from the oil-soluble polymers | | |
|---|---|---|---|
| Example | EHA (mol %) | SMA (mol %) | DMAEMA (mol %) |
| P1 | 42 | 42 | 16 |
| P2 | 40 | 40 | 20 |
| P3 | 35 | 35 | 30 |
| P4 | 50 | 25 | 25 |
| P5 | 44 | 44 | 12 |

TABLE 2

| | Molecular weight data obtained from the polymers P1-5. | | |
|---|---|---|---|
| Example | $M_n$ (kg/mol) | $M_w$ (kg/mol) | PDI |
| P1 | 86 | 249 | 2.9 |
| P2 | 157 | 291 | 1.9 |
| P3 | nd | nd | nd |
| P4 | 84 | 237 | 2.8 |
| P5 | 199 | 305 | 1.5 |

Preparation of the Base Polymer (Example B1)

In a 2 L double walled glass reactor, equipped with an overhead stirrer, thermometer, a nitrogen inlet and a distillation bridge connected to a reflux column, a round-bottom flask filled with the hydrophobic solvent and a vacuum pump, 600.1 g of Exxsol D40 (ExxonMobil Chemical) was placed and heated to a temperature of 30° C. To this hydrophobic phase, 4.0 g of a solution (28.7%) containing a polymeric stabilizer which contain acrylic acid was added. Additionally, 2.5 g of sorbitol monooleate (Span80, Sigma-Aldrich) was dissolved in the hydrophobic phase. This solution was subsequently stripped with nitrogen for 90 minutes. At the same time, in a 1 L beaker glass 158 g of a 50 wt % acrylamide (BASF) solution was placed and to this 0.6 g of a 50 wt % pentetic acid (Trilon® C, BASF) solution, 176.4 g of a 50 wt % sodium 2-acrylamido-2-methylpropane sulfonate solution and 2.5 g of a 2 wt % methylbisacrylamide solution. The pH of this solution was adjusted to a pH of 6.0 using 1.2 g of sulfuric acid (5 wt % solution) after which 7.4 g of water was added. To this aqueous monomer solution 3.6 g of a 1 wt % sodium sulfite and 3.6 g of a 4 wt % 2.2'-Azobis(2-methylpropionamidine)dihydrochloride solution were added. The nitrogen probe was removed from the hydrophobic phase and 1.2 g of a 0.1 wt % phenothiazine solution was added. The stirrer rate was adjusted and the aqueous monomer phase was added to the hydrophobic phase. The two-phase system was stirred for 2 minutes at the predetermined stirring rate before 3.6 g of a 0.5 wt % tert-butyl hydroperoxide was added to initiate the reaction. After the maximum temperature in the reactor was reached, the temperature in the reactor was increased to 75° C. using a thermostat. After which, the reaction mixture was put under vacuum to distill of the water from the aqueous monomer phase. This yields a suspension of cross-linked polymer particles in the hydrophobic phase. The particle size of these polymer particle was determined using light scattering and the $d_{50}$ was determined to be 90 μm. To this suspension of polymer particles in oil 0.5 wt % of a 30 wt % P1 solution was added. The particles were subsequently separated from the hydrophobic phase and dried in an oven at 50° C.

The examples B2-B15, as well as the reference example M1, have been prepared using the same method as described for B1. The compositions of the various examples have been described in Table 3.

TABLE 3

Composition from the agglomerated polymer particles in oil.

| Example | Oil-soluble polymer | Amount (wt %) |
| --- | --- | --- |
| M1 | — | 0 |
| B1 | P1 | 0.5 |
| B2 | P1 | 1 |
| B3 | P1 | 2 |
| B4 | P2 | 0.5 |
| B5 | P2 | 1 |
| B6 | P2 | 2 |
| B7 | P3 | 0.5 |
| B8 | P3 | 1 |
| B9 | P3 | 2 |
| B10 | P4 | 0.5 |
| B11 | P4 | 1 |
| B12 | P4 | 2 |
| B13 | P5 | 0.5 |
| B14 | P5 | 1 |
| B15 | P5 | 2 |

Figure 1A:
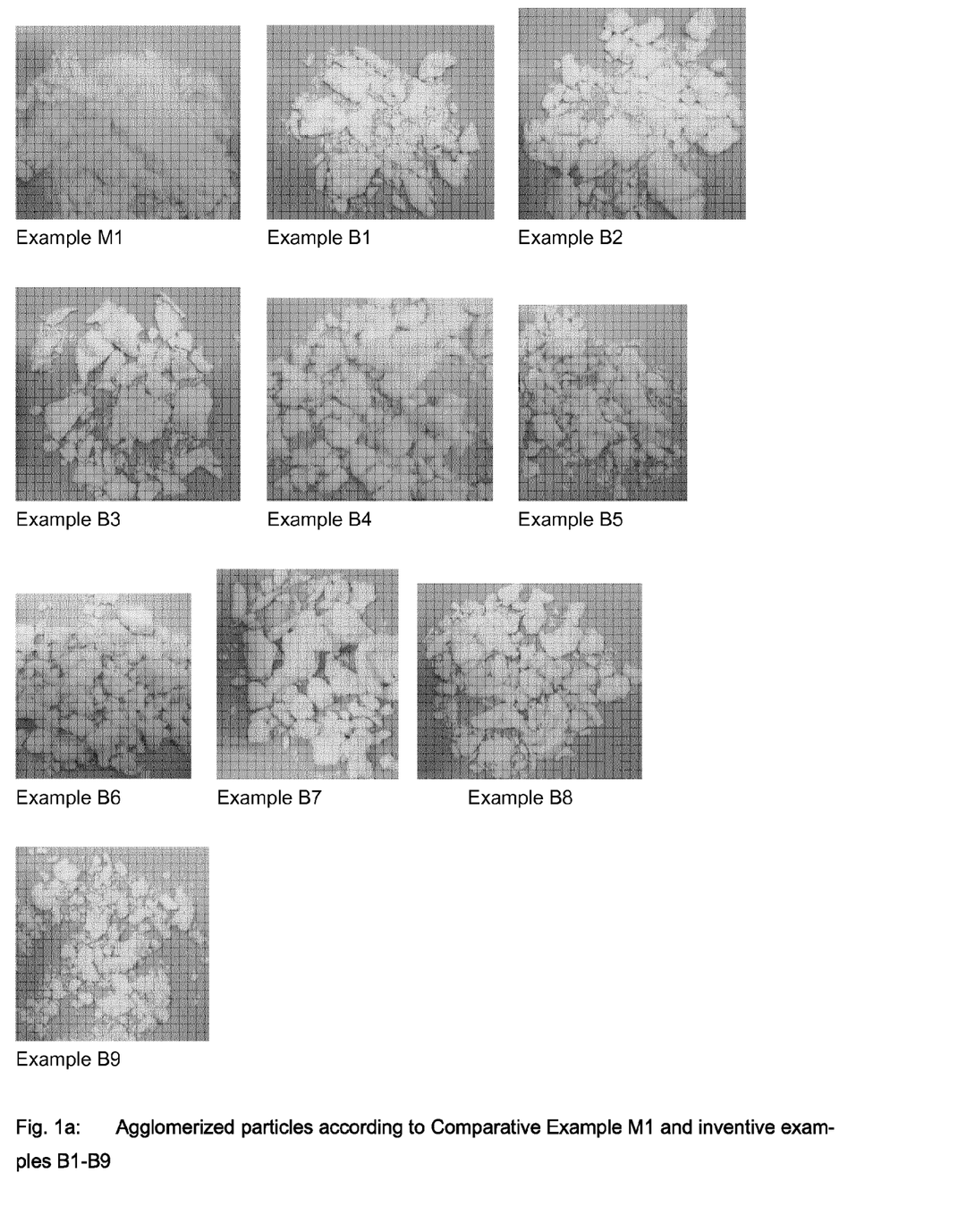
FIG. 1a shows the primary particle distribution.
Figure 1B:
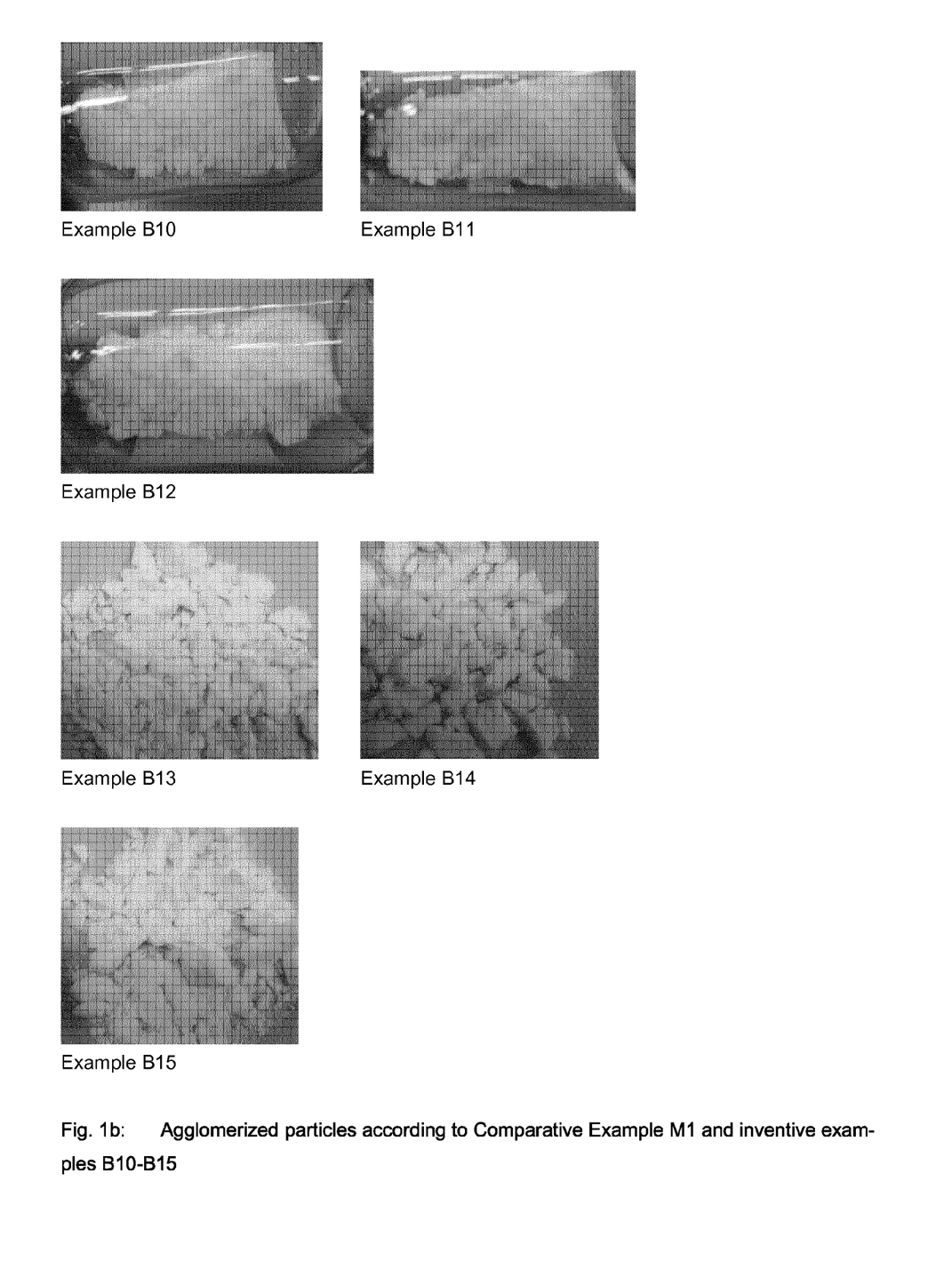
FIG. 1b the sample which was treated with then a hydrophobic polymer and afterwards sheared to break up the agglomerates. Not all the agglomerates were broken during the shearing, but most of them were reduced to primary particles.
Figure 2:
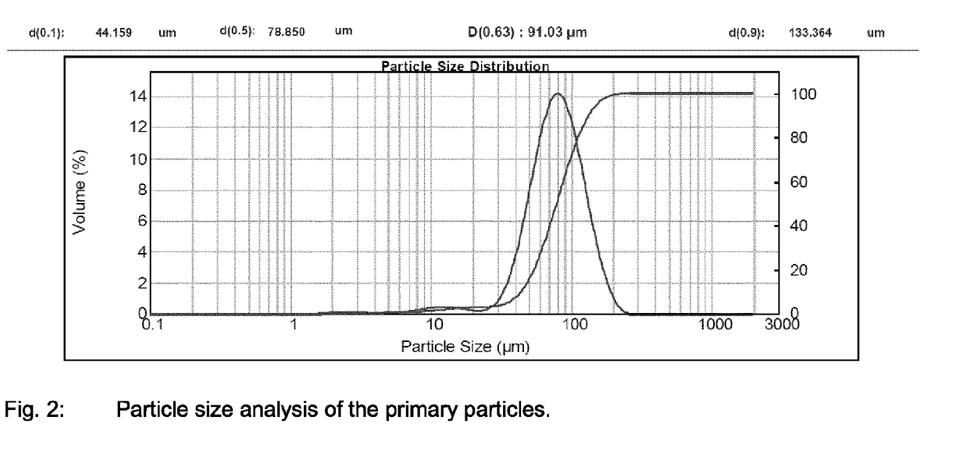
FIG. 2 shows a particle size analysis of primary particles.
Figure 3:
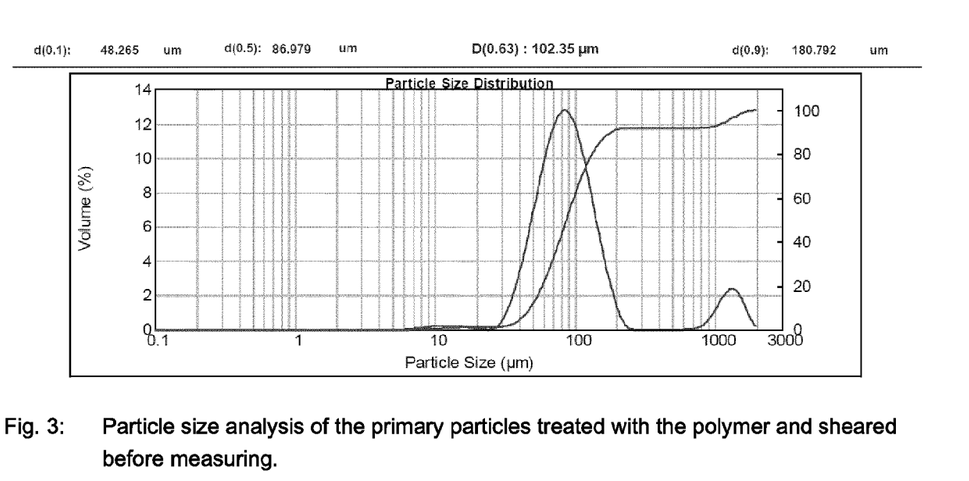
FIG. 3 shows a particle size analysis of primary particles treated with the polymer and sheared before measuring.

To study the influence of the oil soluble polymer on the agglomeration of the primary particles pictures of the system was taken after drying. These pictures show that the agglomeration of the beads in oil using the described polymers was successful (FIGS. 1a and 1b).

Example M1 (Comparative)

Inverse suspension polymerization polymers without the addition of any extra additives. The obtained product was mainly a fine powder. Small amount of agglomerates was formed due to drying effects.

Example 1B

Polymer P1 (30 wt % in solvent) was added at 0.5 wt % on the total weight of the suspension. Some large lumps (size>1 cm) were formed and the amount of primary particles was significantly reduced because these were agglomerated. Clearly the larger particles were not formed due to drying effects in the oven.

Example B2

Polymer P1 (30 wt % in solvent) was added at 1 wt % on the total weight of the suspension. Larger agglomerates were formed compared to example M1 and no primary particles were observed anymore. The average agglomerate size increased, but this could not be quantified since the KGA was not able to measure accurately above a size of 3 μm. The amount of smaller structures decreased compared to example B1.

Example B3

Polymer P1 (30 wt % in solvent) was added at 2 wt % on the total weight of the suspension. Only larger (>0.5 cm) agglomerates were formed and no primary particles were observed after the addition of this polymer. The amount of large structures increased when compared with sample B1 and B2. Clearly the addition of more from this oil soluble polymer leads to more agglomeration.

Example B4

Polymer P2 (30 wt % in solvent) was added at 0.5 wt % based on the total weight of the suspension. After the addition of this polymer the amount of primary particle was significantly reduced and larger agglomerates (>0.5 cm) were formed. The average agglomerate size seemed to be larger compared to the example B1. Therefore, this polymer seems to be more desirable compared to example B1.

Example B5

Polymer P2 (30 wt % in solvent) was added at 1 wt % based on the total weight of the suspension. The amount of primary particles was significantly reduced and larger agglomerates were obtained. The size of these agglomerates did not vary too much from example B4.

Example B6

Polymer P2 (30 wt % in solvent) was added at 2 wt % based on the total weight of the suspension. The amount of primary particles was significantly reduced and larger agglomerates were obtained. The average size of these agglomerates was very similar to those exhibited in example B5. Apparently for this polymer no concentration dependent behavior could be observed.

Example B7

Polymer P3 (30 wt % in solvent) was added at 0.5 wt % based on the total weight of the suspension. Clearly larger aggregates were formed from the primary particles. The primary particles were not observed anymore after the addition of the polymer. Even at low content of the polymer the amount of primary particles has been significantly reduced, more compared to the previous examples.

Example B8

Polymer P3 (30 wt % in solvent) was added at 1 wt % based on the total weight of the suspension. Clearly larger aggregates were formed from the primary particles. The primary particles were not observed anymore after the addition of the polymer. No significant differences between this examples and example B7 could be observed.

Example B9

Polymer P3 (30 wt % in solvent) was added at 2 wt % based on the total weight of the suspension. Clearly larger aggregates were formed from the primary particles. The primary particles were not observed anymore after the addition of the polymer. The smaller agglomerates were formed since the amount of polymer particles in the oil was too low.

Example B10

Polymer P4 (30 wt % in solvent) was added at 0.5 wt % based on the total weight of the suspension. The formation of some larger agglomerates was observed, but still significant amounts of primary particles were observed. These results are less desirable compared to examples B1 to B9.

Example B11

Polymer P4 (30 wt % in solvent) was added at 1 wt % based on the total weight of the suspension. The formation of some larger agglomerates was observed, but still significant amounts of primary particles were observed. These results are less desirable compared to examples B1 to B6 and no significant improvement compared to B10 was observed.

Example B12

Polymer P4 (30 wt % in solvent) was added at 2 wt % based on the total weight of the suspension. Larger agglomerates were observed and the amount of primary particles seemed to have been reduced compared to examples B10 and B11, but the still not as good as examples B1-B6. Hence, this polymer is less effective in agglomeration of the polymer particles

Example B13

Polymer P5 (30 wt % in solvent) was added at 0.5 wt % based on the total weight of the suspension. After the addition of the polymer the formation of a large number of larger (>0.5 cm) agglomerates was observed and the amount of primary particles was significantly reduced.

Example B14

Polymer P5 (30 wt % in solvent) was added at 1 wt % based on the total weight of the suspension. After the addition of this polymer larger agglomerates (>1 cm) were obtained, and the addition of more polymer clearly lead to an increase of the agglomerate size compared to example B13.

Example B15

Polymer P5 (30 wt % in solvent) was added at 2 wt % based on the total weight of the suspension. After the addition of this polymer larger agglomerates (>1 cm) were obtained, and the addition of more polymer clearly lead to an increase of the agglomerate size compared to example B13. However, the amount of smaller agglomerates was larger when compared to example B14 what could be due to over dosing of the oil soluble polymer.

All the prepared samples shown in examples B1-B15 could be reduced again to their primary particles just by the application of shear forces, for example by pressing and rubbing the beads between the fingers or using a mortar and pestle. KGA could be used to show that this was feasible.

The absorption of the superabsorbers should not be negatively influenced by the agglomeration process and this would be shown using the CAC test. The results from these experiments have been presented in Table 4. Clearly, the adsorption and retention of the superabsorbers, both in water and in 1% calcium formate solution was retained.

TABLE 4

| | Adsorption and retention capacity of the different examples | | | |
|---|---|---|---|---|
| | dest. H$_2$O (g/g) | | Calcium formate (g/g) | |
| Example | Absorption | Retention | Absorption | Retention |
| M1 | 242.74 | 157.44 | 20.92 | 13.78 |
| B7 | 230.01 | 148.25 | 21.21 | 12.77 |
| B8 | 217.66 | 147.01 | 21.56 | 13.27 |
| B9 | 214.70 | 149.42 | 19.22 | 11.02 |

The invention claimed is:

1. Water-swellable polymer particles, comprising
   i) up to 99.9 wt.-% of a hydrophilic base polymer (B) which is optionally crosslinked, and
   ii) up to 10.0 wt.-% of a hydrophobic polymer (P), which is a copolymer of up to 95.0 mol-% of at least one (meth)acrylic acid ester and/or (meth)acrylic amide of formula (I)

wherein $R^1$ is hydrogen or a methyl group, V is $OR^2$ or $NR^3R^4$, $R^2$ and $R^3$ independently from each other are hydrogen or linear or branched $C_1$ to $C_{30}$ alkyl, and $R^4$ is hydrogen or linear or branched $C_1$ to $C_{30}$ alkyl, and up to 35.0 mol-% of at least one ethlyenically unsaturated amine-containing monomer,
   based on an overall weight of the water-swellable polymer particles.

2. The water-swellable polymer particles according to claim 1, wherein the hydrophilic base polymer (B) comprises carboxyl groups, sulfonic acid groups and/or salts thereof and mixtures thereof.

3. The water-swellable polymer particles according to claim 1, which have a particle size $d_{50}$ equal to or below 250 µm.

4. The water-swellable polymer particles according to claim 1, wherein the hydrophilic base polymer (B) is a copolymer of
i) at least one acid-containing monomer being an ethylenically unsaturated carboxylic acid-containing monomer and/or a sulfonic acid-containing monomer of formula (IIa) and/or formula (IIb)

wherein Y is —O— or —NH—, $R^5$ is hydrogen or a methyl group, $R^6$, $R^7$ and $R^8$ are independently from each other hydrogen, OH, $C_1$-$C_6$-alkyl or $C_6$-$C_{14}$-aryl, n is 0 or 1, M is hydrogen, a metal cation or an ammonium cation and a represents 1 or 1/valency of the metal cation, ii) optionally at least one amide-containing monomer being a (meth)acrylamide-containing monomer of formula (III)

wherein $R^9$ is hydrogen or methyl and $R^{10}$ and $R^{11}$ are independently from each other hydrogen, linear or branched $C_1$-$C_{20}$-alkyl, $C_5$-$C_8$-cycloalkyl or $C_6$-$C_{14}$-aryl,
or N-Vinylformamide, and
iii) optionally a cross-linker.

5. The water-swellable polymer particles according to claim 4, wherein the hydrophilic base polymer (B) comprises
a) 10.0 to 70.0 mol-% of the at least one acid-containing monomer,
b) 0.0 to 90.0 mol-% of the at least one amide-containing monomer of formula (III), and
c) 0.0 to 30.0 mol-% of the cross-linker.

6. The water-swellable polymer particles according to claim 4, wherein the at least one acid-containing monomer is selected from the group consisting of acrylic acid, methacrylic acid, ethacrylic acid, α-chloroacrylic acid, α-cyanoacrylic acid, β-methylacrylic acid (crotonic acid), α-phenylacrylic acid, β-acryloxypropionic acid, sorbic acid, α-chloro sorbic acid, 2'-methylisocrotonic acid, cinnamic acid, p-chlorocinnamic acid, itaconic acid, citraconic acid, mesacronic acid, glutaconic acid, aconitic acid, maleic acid, fumaric acid, maleic anhydride, 2-acrylamido-2-methylpropane sulfonic acid (AMPS), styrenesulfonic acid, vinyl sulfonic acid, allyl sulfonic acid, 2-methylacrylamido-2-methylpropane sulfonic acid, 2-acrylamidobutane sulfonic acid, 3-acrylamido-3-methyl-butane sulfonic acid, 2-acrylamide-2,4,4-trimethylpentane sulfonic acid, 2-sulfoethyl acrylate, 2-sulfoethyl methacrylate, 3-sulfopropyl acrylate, 3-sulfopropyl methacrylate, 2-hydroxy-3-methacryloxypropyl sulfonic acid, a salt thereof, and a mixture thereof.

7. The water-swellable polymer particles according to claim 4, wherein the hydrophilic base polymer (B) comprises the at least one amide-containing monomer, which is selected from the group consisting of (meth)acrylamide, N-methyl(meth)acrylamide, N,N'-dimethyl(meth)acrylamide, N-ethylacrylamide, N,N-diethylacrylamide, N-cyclohexylacrylamide, N-benzylacrylamide, N-tert-butylacrylamide, N-Vinylformamide, and a mixture thereof.

8. The water-swellable polymer particles according to claim 4, wherein the hydrophilic base polymer (B) comprises the cross-linker, which is selected from the group consisting of N,N'-methylenebisacrylamide, N,N'-methylenebi smethacrylamide, hexamethylenebismaleimde, ethylene glycol divinyl ether, triethylene glycol divinyl ether, cylcohexanediol divinyl ether, triallyl amine and/or tetra allyl ammonium salts, tetraallyloxyethane, pentaerythrittriallylether, divinyl benzene, triallyl isocyanurate, ethylene diamine, diethylene triamine, 1,4-butanediol diacrylate, 1,4-butanediol dimethacrylate, 1,3-butyleneglycol diacrylate, 1,3-butyleneglycol dimethacrylate, diethyleneglycol diacrylate, diethyleneglycol dimethacrylate, ethyleneglycol dimethacrylate, ethoxylated bisphenol-A-diacrylate, ethoxylated bisphenol-A-dimethacrylate, 1,6-hexanediol diacrylate, 1,6-hexanediol dimethacrylate, neopentylglycol dimethacrylate, polyethyl eneglycol diacrylate, polyethyleneglycol dimethacrylate, triethyleneglycol diacrylate, tetraethyleneglycol dimethacrylate, dipentaerythritpentaacrylate, pentaerythrittetraacrylate, pentaerythrittriacrylate, trimethylolpropane triacrylate, trimethyl olpropane trimethacrylate, cyclopentadiene diacrylate, tris(2-hydroxyethyl) isocyanurate triacrylate, tris(2-hydroxy) isocyanurate trimethylacrylate, divinyl esters of polycarboxylic acids, diallyl esters of polycarboxylic acids, triallyl terephthalate, diallyl maleate, diallyl fumarate, trivinyl trimellitate, divinyl adipate, diallyl succinate, glycidylacrylate, allylglycidether, ethyleneglycol diglycidether, diethyleneglycol diglycidether, polyethyleneglycol diglycidether, polypropyleneglycol diglycidether, polyethyleneglycolmonoallylether acrylate, polyethyleneglycolmonoallylether methacrylate, and a mixture thereof.

9. The water-swellable polymer particles according to claim 1, wherein the hydrophobic polymer (P) is a copolymer of at least two (meth)acrylic acid esters being a first (meth)acrylic acid ester or (meth)acrylic amide of formula (Ia) and a second (meth)acrylic acid ester or (meth)acrylic amide of formula (Ib)

(Ia)

(Ib)

wherein $R^{12}$ is hydrogen or a methyl group,
W is $OR^{13}$ or $NR^{13}R^{14}$
$R^{13}$ is a linear or branched $C_2$ to $C_9$ alkyl chain,
$R^{14}$ is hydrogen or a linear or branched $C_2$ to $C_9$ alkyl chain,
T is $OR^{16}$ or $NR^{16}R^{17}$,
$R^{16}$ is a linear or branched $C_{10}$ to $C_{30}$ alkyl chain,
$R^{17}$ is hydrogen or a linear or branched $C_{10}$ to $C_{30}$ alkyl chain,
and at least one ethlyenically unsaturated amine-containing monomer.

10. The water-swellable polymer particles according to claim 9, wherein the first (meth)acrylic acid ester or (meth)acrylic amide of formula (Ia) is selected from the group consisting of ethylhexyl (meth)acrylate, n-butyl (meth)acrylate, tert-butyl (meth)acrylate, n-pentyl (meth)acrylate, 2-methylbutyl (meth)acrylate, n-hexyl (meth)acrylate, 2-methylpentyl (meth)acrylate, 2-ethylbutyl (meth)acrylate, n-heptyl (meth)acrylate, n-octyl (meth)acrylate and a mixture thereof, and the second (meth)acrylic acid ester or (meth)acrylic amide of formula (Ib) is selected from the group consisting of stearyl (meth)acrylate, ethylhexyl (meth)acrylate, n-octyl (meth)acrylate, n-decyl (meth)acrylate, n-dodecyl (meth)acrylate, tridecyl (meth)acrylate, 2-propylheptyl (meth)acrylate and a mixture thereof.

11. The water-swellable polymer particles according to claim 1, wherein the at least one ethlyenically unsaturated amine-containing monomer is a (meth)acrylic acid ester or (meth)acrylic amide of formula (IV)

wherein $R^{18}$ is hydrogen or a methyl group,
X is —O— or —NH—,
$R^{19}$ and $R^{20}$ are independently from each other hydrogen or linear or branched $C_1$ to $C_{10}$ alkyl,
and p is in the range of 1 to 10.

12. The water-swellable polymer particles according to claim 1, wherein the at least one ethlyenically unsaturated amine-containing monomer is selected from the group consisting of N,N-dimethylaminoethyl (meth)acrylate, N,N-dimethylaminopropyl (meth)acrylate, N,N-dimethyl aminoethyl (meth)acrylamide, and a mixture thereof.

13. A process for preparing the water-swellable polymer particles according to claim 1, the process comprising
  i) providing a suspension comprising the hydrophilic base polymer (B) and a hydrophobic solvent,
  ii) adding the hydrophobic polymer (P) to the suspension, thereby obtaining the water-swellable polymer particles, and
  iii) separating the water-swellable polymer particles from the hydrophobic solvent.

14. The process according to claim 13, further comprising,
  exposing the water-swellable polymer particles obtained in the separating iii) to mechanical force and/or a composition having a pH value of at least 12.

15. An article, comprising the water-swellable polymer particles according to claim 1.

* * * * *